United States Patent [19]

Bonsack

[11] 4,310,495
[45] Jan. 12, 1982

[54] LOW-TEMPERATURE FLUID-BED CHLORINATION OF TITANIFEROUS ORE

[75] Inventor: James P. Bonsack, Aberdeen, Md.

[73] Assignee: SCM Corporation, New York, N.Y.

[21] Appl. No.: 165,252

[22] Filed: Jul. 2, 1980

[51] Int. Cl.³ .............................................. C01G 23/02
[52] U.S. Cl. ........................................ 423/76; 423/74; 423/78; 423/79; 75/1 T
[58] Field of Search ......................... 423/75, 76, 78, 79; 75/1 T, 112, 113

[56] References Cited

U.S. PATENT DOCUMENTS

| | | | |
|---|---|---|---|
| 1,179,394 | 4/1916 | Barton | 423/78 |
| 2,184,884 | 12/1939 | Muskat et al. | 75/112 |
| 2,761,760 | 7/1956 | Kamlet | 423/78 |
| 3,977,863 | 8/1976 | Glaeser | 423/76 |
| 4,117,076 | 9/1978 | Gueguin | 423/78 |
| 4,244,935 | 1/1981 | Dell | 423/137 |

Primary Examiner—Herbert T. Carter
Attorney, Agent, or Firm—Merton H. Douthitt; Gordon P. Becker

[57] ABSTRACT

A low temperature (less than 800° C.) process for chlorinating titaniferous material in a fluidized bed is disclosed. A porous carbon reductant having micropores with a pore diameter of less than 20 Å is utilized together with conventional titaniferous materials and conventional chlorine sources to achieve reaction at the present low temperatures.

9 Claims, 1 Drawing Figure

LOW-TEMPERATURE FLUID-BED CHLORINATION OF TITANIFEROUS ORE

BACKGROUND OF THE INVENTION

This invention relates to low-temperature fluid-bed chlorination of titaniferous ores using porous carbon reductants.

Titaniferous materials are often subjected to chlorination as chlorination is an efficient and economical way to obtain a high purity source of titanium for making titanium alloys, titanium compounds, and especially pigmentary titanium dioxide. Several processes have been described in the art for the chlorination of titaniferous materials. Such processes generally react a titanium-containing raw material such as rutile ore or ilmenite ore, with a chlorine-providing material and a carbon reductant according to one or both of the following equations:

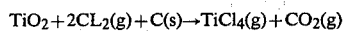
$$TiO_2 + 2Cl_2(g) + C(s) \rightarrow TiCl_4(g) + CO_2(g)$$

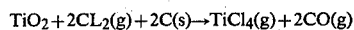
$$TiO_2 + 2Cl_2(g) + 2C(s) \rightarrow TiCl_4(g) + 2CO(g)$$

Conventional chlorination reactions are generally carried out at about 1000° C., but can be carried out at any temperature in the range from about 800° C. to about 2000° C., using various carbon reductants and chlorine sources.

Low-temperature chlorination, i.e. at a temperature below 800° C., has also been suggested. U.S. Pat. No. 2,761,760 suggests chlorinating a titaniferous material at a temperature as low as 400° C. using NOCl or a blend of NOCl and $Cl_2$ as the chlorinating agent and preferably using a finely ground carbon reductant. The NOCl is described as being a very reactive chlorinating agent and the reactants are finely ground to increase their reactivity; however, substantially complete chlorination is not obtained. At best 78% of the Ti is chlorinated. U.S. Pat. No. 2,936,217 describes another chlorination process which operates at temperatures from 700° C. to 950° C. Finely ground carbon and finely ground titanium oxide material of controlled particle size are mixed and the mixture is agglomerated into granules of further controlled particle size. The granules are then fluidized and reacted with a chlorine source. However, it is taught that the carbon source is a relatively unimportant factor in this process and that only particle size is worthy of control. Further, it is taught that preagglomeration must be practiced here to achieve effective reaction.

Contrary to the teachings of the prior art, I have found that the carbon used in the low-temperature chlorination of a titaniferous material can have a substantial effect on the completeness of said chlorination reaction. Further, I have found that fluidized bed techniques can be effectively used in low-temperature clorination of granular titaniferous materials without the use of heretofore required fine grinding, preagglomeration of titaniferous material and carbon reductant, or resorting to highly reactive chlorine sources such as NOCl.

In accord with the present invention, I have found that titanium-containing materials and ores can be substantially chlorinated in a fluidized bed process at surprisingly low temperatures of about 600° C. to about 800° C. if a porous granular carbon is used as the carbon reductant.

It is therefore an object of the present invention to chlorinate titanium-containing materials and ores in a fluid bed at a temperature of between about 600° C. and 800° C. using a porous carbon reductant.

A further object and advantage of the present invention is that the present low-temperature chlorination process is more selective relative to impurity oxides in the materials and ores being chlorinated resulting in greater reactor efficiency and ease of operation due to the absence of normally liquid or sticky chlorides produced during high-temperature chlorination processes which adhere to reactor surfaces.

A still further object and advantage of the present chlorination process is that the fluidized bed is maintained in its fluidized condition with greater ease due to the lower temperatures and associated reduced softening and melting of fluidized materials.

These and other objects and advantages of the present invention will become more apparent from the detailed description of the invention.

SUMMARY OF THE INVENTION

The present invention is a low-temperature fluid-bed process for the chlorination of titaniferous ores. A mixture of titaniferous ore and porous carbon reductant having internal surface due to micropores of less than 20 Å is reacted with a chlorine-providing material in a fluidized bed at a temperature from about 600° C. to about 800° C. The present process has been found effective and efficient for substantially chlorinating the titanium values of most titanium-bearing ores.

DETAILED DESCRIPTION OF THE INVENTION

Figure 1:
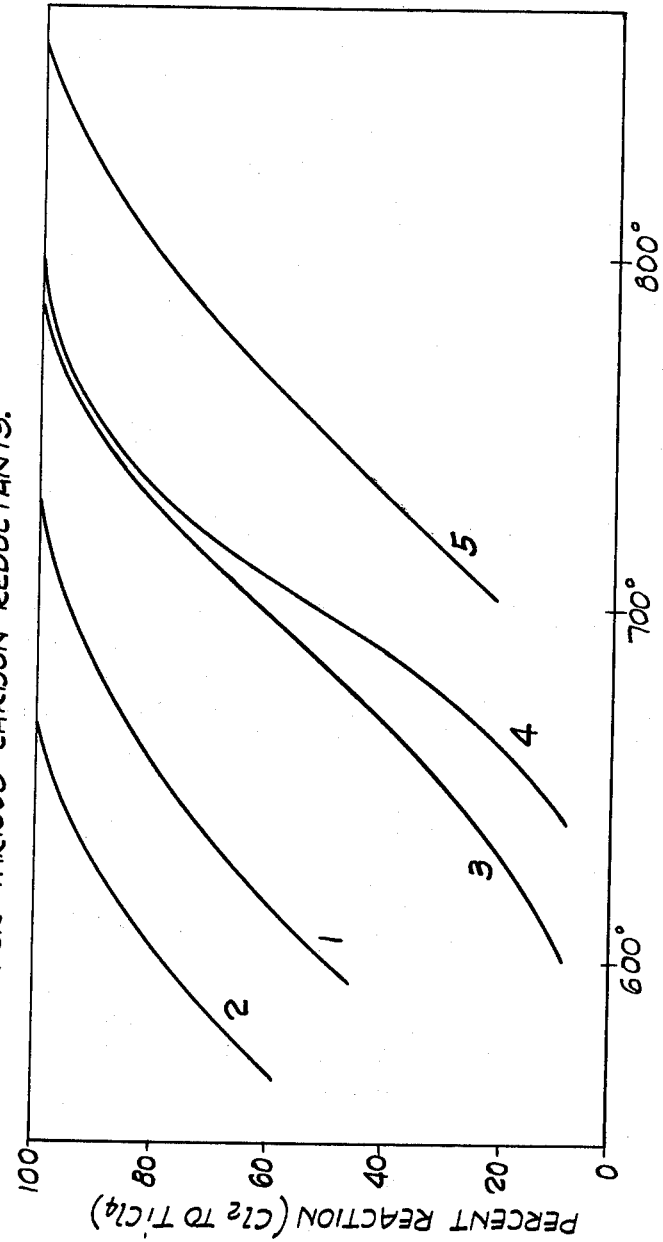
FIG. 1 shows a graph of the percent chlorination versus reaction temperature for various carbon reductants described in the examples.

The present invention is a low-temperature fluid-bed chlorination process.

Porous carbon reductants useful in the present invention contains micropores having a pore diameter of less than about 20 Å. Typically such porous carbon reductants will have at least about 10 $m^2/g$. of surface area in such micropores, advantageously at least about 100 $m^2/g$. of surface area in such micropores and preferably about 500 $m^2/g$. of such internal surface. Non-porous carbons and carbons having large pores, e.g. charcoal, are not effective in the present process.

The carbon particles can be any size useful in a fluid-bed process. Such particles must be small enough to be fluidized by the fluidizing gas and yet be large enough such that they are not carried out of the fluid bed by the off-gas stream. Granular materials of about −8 mesh are typical. However, the average particle size can range from about 4 mesh to about 200 mesh and be useful in the present fluid-bed process. Preferably the carbon particles will have an average particle size greater than about 100 mesh and will be substantially retained on a 140-mesh screen.

A preferred high surface area carbon is granular coal treated to increase its internal surface area by making it porous. Coal is an inexpensive source of carbon and can be obtained relatively free of undesirable impurities. It is readily available in granular forms of various sizes and size distribution useful in the present invention. Coal is also an amorphous form of carbon and this attribute has been found to be advantageous in the present invention.

The granular titaniferous material useful in the present invention can be any titanium-containing compound or raw material such as rutile ore, ilmenite ore, or other. A particularly advantageous embodiment of the present invention is that the present low-temperature chlorination process can be carried out utilizing naturally occurring titanium-bearing sand such as naturally occurring sand-sized rutile ore exemplified by certain Australian beach sands. Such sand-sized rutile ore is typically −40 mesh and +140 mesh. However, granular titaniferous materials having an average particle size from about 4 mesh to about 200 mesh can be used in the present process. The titaniferous material can be substantially pure or contain a wide variety of impurities. For practical and economic operation of the present process the titaniferous material should contain at least about 90% $TiO_2$; however, the process will operate with lesser amounts of $TiO_2$ in the titaniferous material.

The chlorine-providing material can be any chlorine-containing compound which is gaseous at the reaction temperature. In the present fluid-bed chlorination process the chlorine-providing material is used as the fluidizing gas in the process. As such, it is preferred that the gas contain a high percentage of chlorine such that a minimum volume of fluidizing gas can be used and maximum reaction rates obtained. Chlorine gas ($Cl_2$) is preferred; however, other organochlorides can be used. For example, HCl, $CCl_4$, and others are suitable chlorine sources. Highly reactive chlorine sources such as NOCl are not required by the present process.

The granular titaniferous material and the granular porous carbon reductant are blended together and charged into the fluid-bed reactor. Discrete particles of titaniferous material and carbon reductant are utilized in the present invention. Preagglomeration of titaniferous material and carbon together into larger granules is not practiced; however, some preagglomeration of titaniferous fines into larger titaniferous material granules or of carbon fines into larger carbon granules, may be practiced within the scope of the present invention. Such agglomerates of titaniferous materials or of carbon reductant are considered to be discrete particles for present purposes so long as any given agglomerate contains only titaniferous material or only carbon reductant and not both.

The reactor temperature is raised and chlorine-providing gas is introduced into the bottom of the reactor to fluidize the bed and an off-gas product stream is withdrawn from the top of the bed. During the reaction process, the temperature is maintained between about 600° C. and 800° C. The off-gas stream is then collected and cooled to condense the products and facilitate their collection.

The low temperature of the present process increases the selectivity of the chlorination reaction for titanium values over impurities such as aluminum, zirconium, and silicon oxides. This is beneficial because the chlorination of aluminum produces $AlCl_3$, which is very corrosive toward the collection chambers used in the fluid-bed chlorination processes. Also, $AlCl_3$ and $ZrCl_4$ tend to condense on the titanium chloride condensation chamber surfaces which results in eventual plugging and shutdown. Furthermore, the production of impurity chlorides consumes chlorine and thereby reduces the overall efficiency of the process and also creates a pollution and disposal problem for such impurity chlorides.

A further benefit of the present low-temperature fluid-bed process is that no liquid metal chloride impurities are formed in the fluid bed itself. For example, at 600° to 670° C. the fluidized bed and the off-gas products would be below the melting points of normally troublesome calcium, magnesium, and iron chlorides. At conventional operating temperatures of greater than about 800° C., liquid chlorides of calcium and magnesium tend to cause bed defluidization.

Similarly, when operating at conventional temperatures, $FeCl_2$ vapor will condense on the off-gas product pipeline wall as a liquid and cause dusty solids in the off-gas to stick. This collection of liquid and dusty materials will eventually plug the apparatus and cause a shutdown. At the low operating temperatures of the present invention, however, these troublesome impurity chlorides are solid and are removed from the bed as a fine dust in the off-gas stream and therefore do not cause plugging or defluidization.

The above-described ability of the present low temperature process further enables the use of particularly impure titaniferous materials containing high levels of calcium, magnesium, and iron impurities that previously had to be avoided in conventional fluid-bed chlorination processes. For example, ilmenite can be chlorinated in the present process without the extreme plugging problems encountered in conventional fluid-bed chlorination process.

A further advantage realized from the use of the present low-temperature process is the ability to increase the $TiCl_4$ production rate or alternatively decrease the carry-over losses of ore and carbon. The gases in the fluid bed expand when heated to reaction temperature. This expansion is considerably less at the lower temperatures used in the present process. Therefore, when using a conventional amount of chlorine-providing material, the velocity of the gases in the fluid bed would be lower and therefore entrain less ore and carbon in the off gas. Alternatively, more chlorine could be used at the low temperatures of the present process compared to conventional processes and increase the production of $TiCl_4$ without any increase in the gas velocity.

The porous carbon reductant useful in the present invention can be produced from non-porous carbon by reacting in a fluidized bed at an elevated temperature with air, $CO_2$, and/or steam until micropores are produced. Typically, about 5% or more of the carbon will be burned off during such treatment. Generally, the more micropores produced and the higher internal surface area created, the higher the carbon burn-off will be. Therefore, it is preferred to treat to a minimum effective internal surface area in order to obtain maximum yield from the carbon raw materials. This treatment should be carried out above about 400° C. When steam or $CO_2$ is used, the reaction is endothermic. When air is used, the reaction is exothermic and will maintain itself without the introduction of any outside heat source. Preferably, such process is carried out on a continuous basis with continuous feeding of carbon and removal of treated product.

An economic and advantageous carbon source is coal. Preferably, the coal used is high rank (anthracite) rather than low rank (bituminous) because the high rank coals attain a higher internal surface area during the above treatment. The coal introduced into the treatment process can be either wet or dry. Dry coal is actually preferred; however, wet granular coal is a much more readily available commerical product. Water is present in such wet coals to hold down dusting during transportation, as a remnant from washing, flotation or other processing or from unprotected storage.

Other processes for making high internal surface area carbons are readily available. Any available process for increasing the internal surface area of carbon can be used for making a porous carbon reductant useful in the present invention, so long as a sufficient amount of the internal micropores are produced. Such processes are typically used for producing activated carbon. Commercially available activated carbons have surface areas from about 300 to about 3000 $m^2/g$. and are effective in the instant process. However, such materials are substantially more expensive at this time than the above-described treated coals. Also, it has been found that the commercially available activated carbons are not as effective and efficient in the present process as the above-described treated coal.

The following examples show ways in which I have practiced the present invention. The examples are not intended to be limiting of the invention. In the examples, all temperatures are in degrees Centigrade and all percentages in parts by weight, unless otherwise specified.

EXAMPLE 1

Australian rutile ore containing about 96% $TiO_2$ and having a particle size such that substantially all of it would pass through a 40-mesh screen and be retained on a 140-mesh screen was chlorinated by blending with a porous carbon reductant and reacting with chlorine in a fluid-bed reactor. The reactor consisted of a 3-inch diameter quartz tube with a porous quartz gas distributor plate near one end.

The porous carbon reductant was prepared by treating granular anthracite coal having a particle size such that it would substantially pass an 18-mesh screen and be retained on a 100-mesh screen. The treatment consisted of heating the coal in a fluid bed in air at about 450° C. until about 15% of the coal burned off and about 163 $m^2/g$. of internal surface had formed. Surface area as expressed here and throughout this specification is "effective surface area" as determined from the $N_2$ adsorption isotherm at −195° C. and application of the standard Brunauer, Emmett, and Teller (BET) procedure. A Digisorb 2500-Automatic Multi-Gas Surface Area and Pore Volume Analyzer manufactured by Micromeritics Instrument Corporation, Norcross, Ga., was used to make these measurements. Granular anthracite coal is substantially amorphous with very little carbon crystallinity.

The rutile ore and porous carbon were then blended together in a ratio of about 3:1 and charged into the reactor to form a bed of about 12 inches deep.

The bed was fluidized by passing $N_2$ gas through it, and the reactor was heated to about 575° C. After heat up, the fluidizing gas was switched to $Cl_2$ with a small measured amount of $N_2$ added to provide a standard for off-gas analysis. The $Cl_2$ feed rate was predetermined to provide a $Cl_2$ flow of about 0.35 feet per second and thus a contact time of 3 to 3.5 seconds with the materials in the fluid bed.

The reactor temperature was raised in 20°–25° intervals, allowed to stabilize, and CO, $CO_2$, $N_2$, $Cl_2$, and $COCl_2$ levels in the off-gas were determined. Percentage of $Cl_2$ consumed was then calculated and plotted against temperature. This graph is shown in FIG. 1.

The $CO_2/CO$ ratio was used to determine carbon consumption and thus additions required to maintain the fluid-bed depth.

EXAMPLE 2

In the procedure of Example 1 a steam-treated porous carbon reductant was used in place of the air-treated carbon.

The present carbon was prepared by heating similarly sized granular coal in a fluidized bed in the presence of superheated steam at a temperature of about 890° C. until about 40% of the coal burned off. The steam-treated coal had a surface area of about 680 $m^2/g$.

A plot of temperature vs. percent $Cl_2$ consumed is shown in FIG. 1.

EXAMPLE 3

In the procedure of Example 1 similarly sized untreated granular anthracite coal was used in place of the porous carbon reductant. This granular coal had a surface area of about 0.1 $m^2/g$.

A plot of temperature vs. percent $Cl_2$ consumed is shown in FIG. 1.

EXAMPLE 4

In the procedure of Example 1 similarly sized granular bituminous char was used in place of the porous carbon reductant. The bituminous char is not porous and thus has only external surface; however, it is substantially amorphous with very little carbon crystallinity. The surface area of the bituminous char was about 0.3 $m^2/g$.

A plot of temperature vs. percent $Cl_2$ consumed is shown in FIG. 1.

EXAMPLE 5

In the procedure of Example 1 calcined petroleum coke having a particle size such that it would substantially pass through a 10-mesh screen and be retained on a 40-mesh screen was used in place of porous carbon reductant. The petroleum coke was nonporous and had a surface area of about 0.3 $m^2/g$.

The petroleum coke was substantially more crystalline than the above carbons.

A plot of temperature vs. percent $Cl_2$ consumed is shown in FIG. 1.

In summary, the examples show the improved low-temperature chlorination achieved when porous carbon reductants are used in place of conventional nonporous carbons. The examples further indicate a small advantage is obtained when amorphous carbon is used in place of substantially crystalline carbons, and this advantage is believed to carry over into the porous carbons as well.

What is claimed is:

1. A process for chlorinating a titaniferous material which comprises fluidizing discrete particles of titaniferous material and discrete particles of porous carbon reductant and contacting said discrete particles with a chlorine-providing material at a temperature of between about 600° C. and about 800° C. until the titanium content of said titaniferous material is substantially chlorinated, said porous carbon reductant is characterized in that it has micropores therein having a pore diameter of less than about 20 Å.

2. The process of claim 1 wherein said titaniferous material and said carbon reductant are each granular materials which substantially pass through an 8-mesh sieve and are substantially retained on a 140-mesh sieve.

3. The process of claim 1 wherein said porous carbon reductant is derived from coal.

4. The process of claim 3 wherein said coal was treated by reacting with air, $CO_2$, or steam at a temperature in excess of about 400° C. until said micropores are produced.

5. The process of claim 1 wherein said temperature is less than about 700° C.

6. The process of claim 1 wherein said porous carbon reductant has an internal surface area in said micropores of at least about 10 $m^2/g$.

7. The process of claim 1 wherein said porous carbon reductant is substantially amorphous.

8. The process of claim 1 wherein said titaniferous material is ilmenite ore.

9. The process of claim 1 wherein said titaniferous material is rutile ore.

* * * * *